(12) United States Patent
Iida

(10) Patent No.: US 6,710,963 B2
(45) Date of Patent: Mar. 23, 2004

(54) DISK CONTROLLER FOR DETECTING HANG-UP OF DISK STORAGE SYSTEM

(75) Inventor: Ikuko Iida, Ome (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 332 days.

(21) Appl. No.: 09/809,032

(22) Filed: Mar. 16, 2001

(65) Prior Publication Data

US 2002/0001152 A1 Jan. 3, 2002

(30) Foreign Application Priority Data

Jun. 29, 2000 (JP) ........................................ 2000-196863

(51) Int. Cl.⁷ .............................................. G11B 19/02
(52) U.S. Cl. ............................ 360/69; 714/2; 711/111; 710/8
(58) Field of Search .................... 360/69, 31; 710/8, 710/15, 17, 36, 48, 200; 714/2, 5, 23, 48; 711/111, 112, 113, 114, 204

(56) References Cited

U.S. PATENT DOCUMENTS 5,594,922 A * 1/1997 Suzuki et al. .................. 710/17
5,890,210 A * 3/1999 Ishii et al. .................... 711/113
6,438,709 B2 * 8/2002 Poisner ......................... 714/23
6,553,476 B1 * 4/2003 Ayaki et al. .................. 711/204

FOREIGN PATENT DOCUMENTS

| JP | 63-88660 | 4/1988 |
| JP | 2-64815 | 3/1990 |
| JP | 9-305731 | 11/1997 |
| JP | 10083635 A | 3/1998 |
| JP | 10-14344 | 5/1998 |
| JP | 11120713 A | 4/1999 |

* cited by examiner

Primary Examiner—Andrew L. Sniezek
(74) Attorney, Agent, or Firm—Pillsbury Winthrop LLP

(57) ABSTRACT

A hang-up detector and an interrupt generator are provided in a disk controller incorporated in a disk storage system. By monitoring a command execution period, the detector detects whether the disk storage system reaches a hang-up state during the execution of a command in the system. The interrupt generator generates an interrupt to a CPU when the detector has detected the hang-up state. Upon receiving the interrupt, the CPU executes control for re-executing the command.

9 Claims, 5 Drawing Sheets

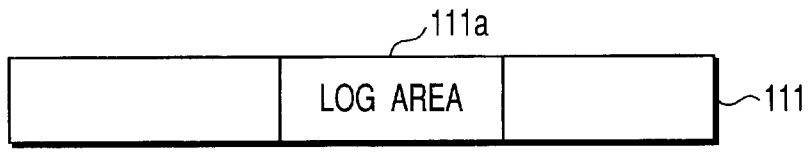
FIG. 2
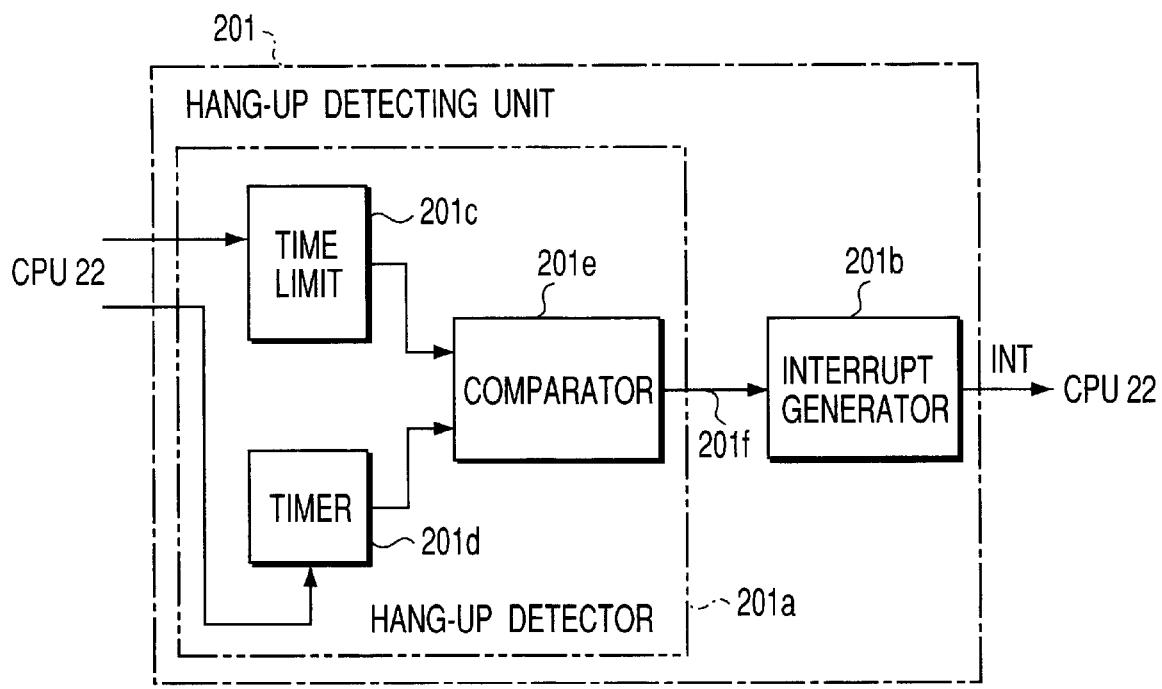
FIG. 3
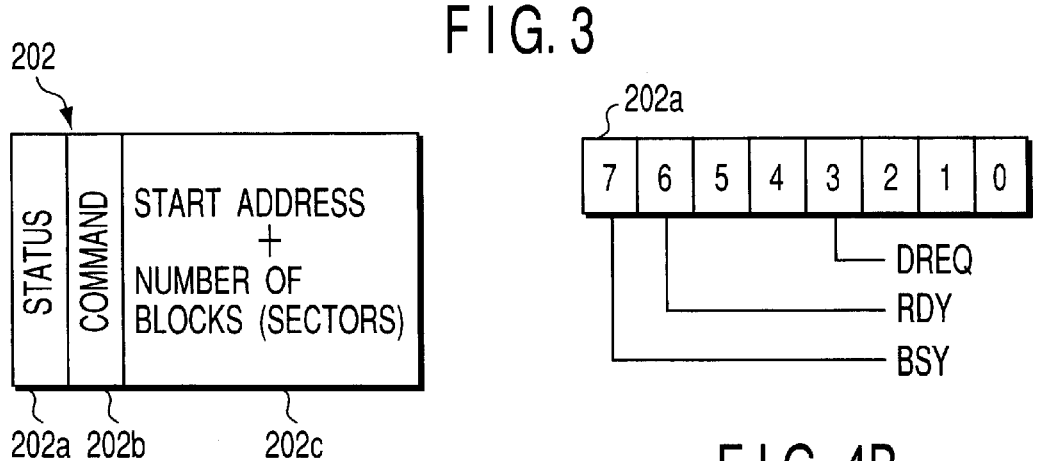
FIG. 4A
FIG. 4B

DISK CONTROLLER FOR DETECTING HANG-UP OF DISK STORAGE SYSTEM

CROSS-REFERENCE TO RELATED APPLICATIONS

This application is based upon and claims the benefit of priority from the prior Japanese Patent Application No. 2000-196863, filed Jun. 29, 2000, the entire contents of which are incorporated herein by reference.

BACKGROUND OF THE INVENTION

The present invention relates to a disk controller incorporated in a disk storage system that has a CPU for controlling execution of a command supplied from a host system, and more particularly to a controller having a function of detecting a hang-up state of the disk storage system when this state occurs while the command from the host system is executed.

A magnetic disk drive is known as a typical disk storage system using a disk storage medium as a medium for storing data. In general, the magnetic disk drive is for use in a host system such as a personal computer. The magnetic disk drive is connected to the host system via a predetermined interface (host interface).

A command from the host system to the magnetic disk drive is supplied thereto via the host interface. A command from the host system to the magnetic disk drive includes a read command, a write command, a self-test command, etc. The self-test command is used for instructing the magnetic disk drive to test itself.

Upon receiving a command from the host system, the magnetic disk drive starts execution of the command. However, there is a case where the magnetic disk drive freezes for some reason before the execution of the command finishes, i.e. it hangs up. It is considered that this state occurs, for example, because the host system and the magnetic disk drive use different protocols. However, the conventional magnetic disk drives have the problem that even when they hang up, they cannot recognize their hang-up state and hence cannot do any processing. This problem also occurs in disk storage systems, other than the magnetic disk drive, such as a floppy disk drive, a CD-ROM drive, a magneto-optical disk drive, etc.

BRIEF SUMMARY OF THE INVENTION

The present invention has been developed in light of the above-described situation, and aims to overcome a hang-up state, when it occurs for some reason in a disk storage system having a CPU for controlling execution of a command, by causing a disk controller incorporated in the system to detect the hang-up state and generate an interrupt to the CPU.

To attain the aim, a disk controller according to the invention is provided in the disk storage system. In this disk storage system, a command supplied from a host system is executed under the control of the CPU. The disk controller includes a detector for detecting a hang-up state of the disk storage system when the hang-up state occurs as a result of execution of a command in the disk storage system, and an interrupt generator for generating an interrupt to the CPU when the detector has detected the hang-up state.

In the disk controller, the detector detects hang-up when it occurs in the disk storage system. To detect hang-up, it is sufficient if a command execution period is monitored. When the detector has detected a hang-up state of the disk storage system, the interrupt generator generates an interrupt to the CPU. Upon receiving the interrupt, the CPU starts control for eliminating the hang-up state. To enable the CPU to execute this control, it is preferable to provide the CPU with means responsive to the interrupt for starting control for re-executing a command having been executed when hang-up occurred. It is also preferable to invalidate the ready-bit of a status register. In this case, the not-ready state indicated by the invalidation of the ready-bit is reported to the host system. This is equivalent to informing the host system that the disk storage system reaches a hang-up state and cannot completely execute a command. As a result, the host system can execute processing for eliminating the hang-up state of the disk storage system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a view illustrating a log area 111a included in a system area 111 appearing in FIG. 1;

FIG. 3 is a block diagram illustrating, in more detail, a hang-up detecting unit 201 appearing in FIG. 1;

FIG. 4A is a view showing, in more detail, a task file register block 202 appearing in FIG. 1;

FIG. 4B is a view showing examples of main status bits in a status register 202a contained in the block 202 of FIG. 4A;

DETAILED DESCRIPTION OF THE INVENTION

An embodiment in which the present invention is applied to a magnetic disk drive will be described with reference to the accompanying drawings.

Figure 1:
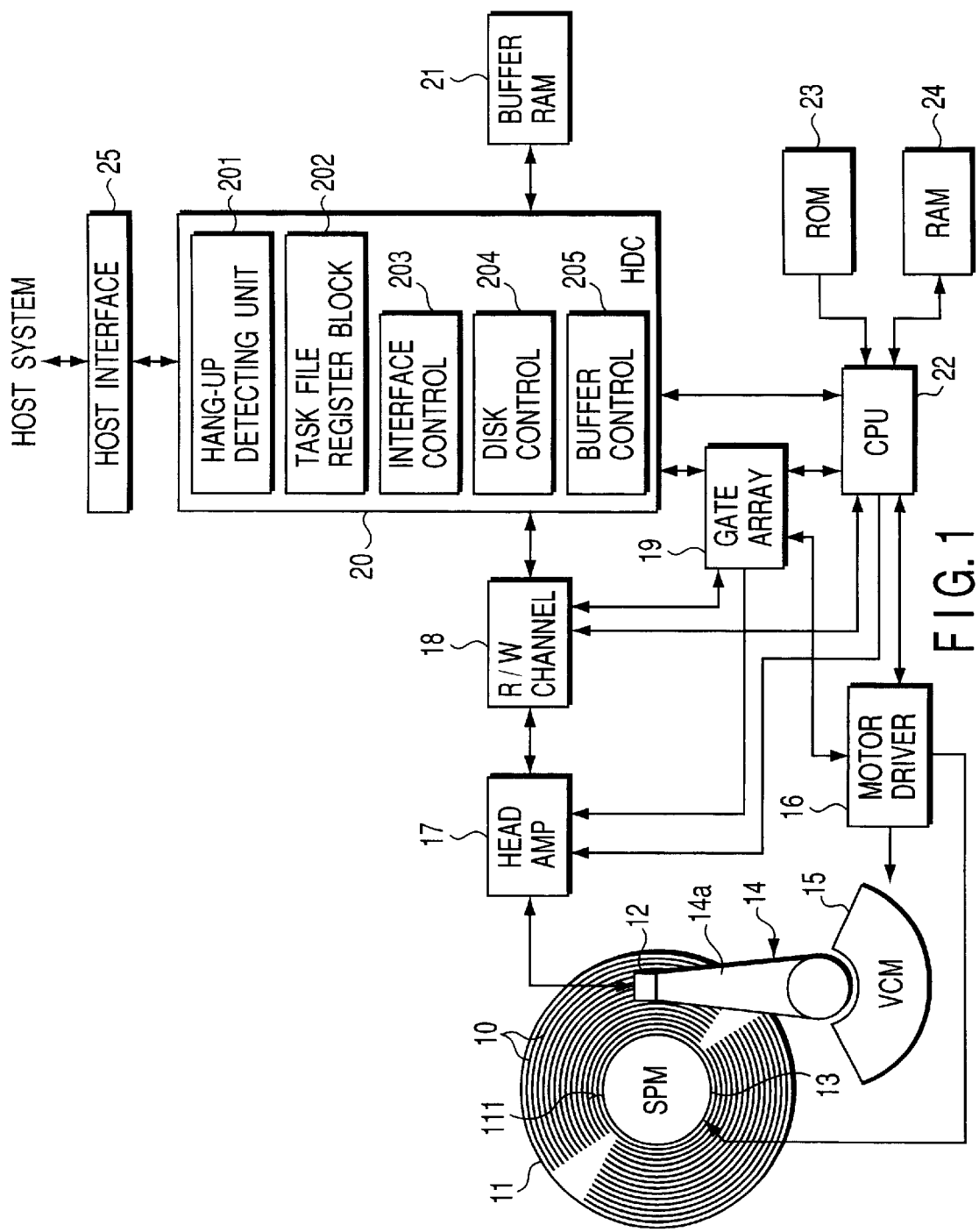
FIG. 1 is a block diagram illustrating the entire structure of a magnetic disk drive (HDD) according to an embodiment of the invention.
Figure 5:
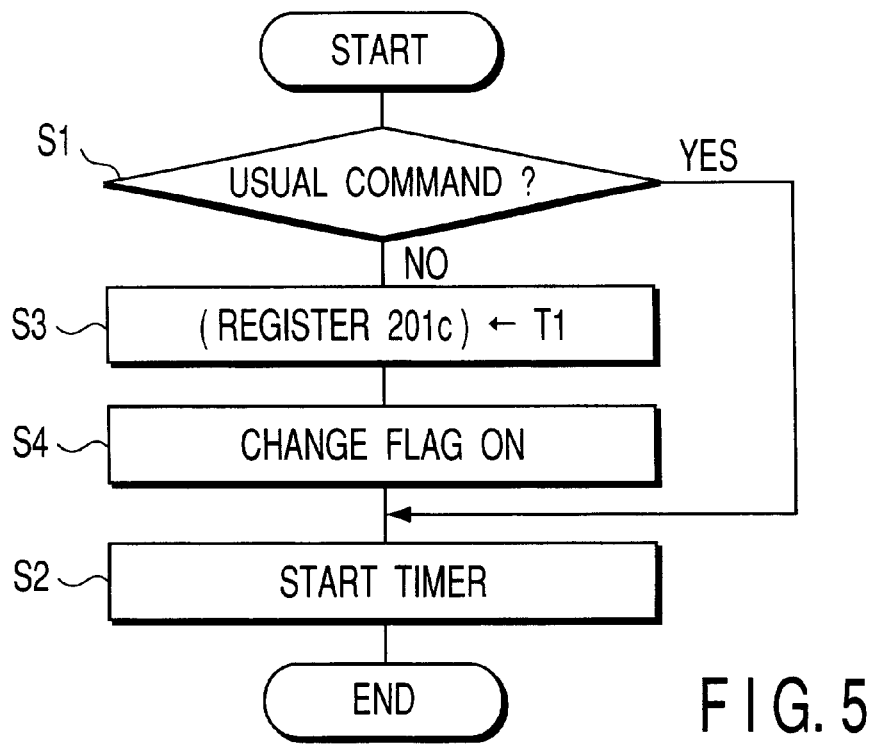
FIG. 5 is a flowchart useful in explaining a procedure of processing executed in the embodiment by a CPU when execution of a command starts.
Figure 6:
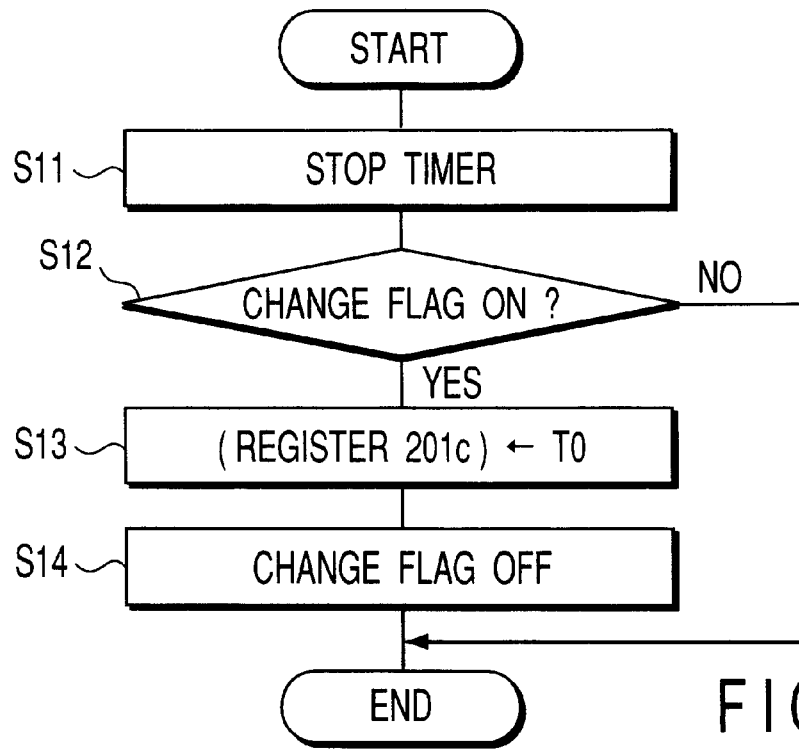
FIG. 6 is a flowchart useful in explaining a procedure of processing executed in the embodiment by the CPU when the execution of a command finishes.

FIG. 1 is a block diagram illustrating the entire structure of a magnetic disk drive (HDD) according to the embodiment of the invention. In FIG. 1, a disk 11 is a storage medium having a recording surface in which data is magnetically recorded. A (magnetic) head 12 is used to write data into the disk 11 (data recording) and to read data from the disk 11 (data reproduction). In this embodiment, one head 12 is provided for one surface (recording surface) of the disk 11 for facilitating the description. In general, however, the disk 11 has two recording surfaces, and respective heads 12 are provided for the two recording surfaces. Further, although in this embodiment, an HDD having a single disk 11 is supposed, the invention is also applicable to an HDD having a plurality of stacked disks 11.

Multiple concentric tracks 110 are formed in each recording surface of the disk 11. For the convenience of drawing the figure, a very smaller number of tracks 110 than the actual number are shown in FIG. 1. Servo areas with servo data recorded therein are provided in each track 110 at regular intervals. The servo data is used to seek a target track and settle the head 12 to a target range including the target track. The servo data includes a track code (cylinder number) and servo burst data. The track code is a track address for recognizing each track 110. The servo burst data is positional error data used for track following control for settling the head 12 to the target range of a target track 110. A plurality of sectors (data sectors) are provided between adjacent servo areas. The servo areas radially extend over the tracks 110 of the disk 11 at circumferentially regular intervals.

The innermost area, for example, of the recording surface of the disk 11 is assigned to the system area 111. Part of the system area 111 is assigned to the log area 111a as shown in FIG. 2. The log area 111a is used to record information (monitor information) obtained by monitoring for predicting a failure in the HDD. This monitor information includes the number of usable substitution sectors, the entire current-flowing period from the start of use of the HDD, an error rate, etc. The monitor information further includes information on occurrence of hang-up, which relates to the invention. The monitor information recorded in the log area 111a can be read using only a predetermined command from the host system.

The disk 11 is rotated at high speed by a spindle motor (SPM) 13. The head 12 is attached to an actuator (head actuator) 14. The actuator 14 chiefly comprises an arm 14a and a voice coil motor (VCM) 15. The arm 14a includes a suspension that holds the head 12. The VCM 15 drives the arm 14a in a radial direction of the disk 11.

The SPM 13 and the VCM 15 are connected to a motor driver (driver IC) 16. The motor driver 16 supplies a control current to the SMP 13 to drive it, and also supplies a control current to the VCM 15 to drive it. A CPU 22 determines values for determining the respective control currents to be supplied from the motor driver 16 to the SMP 13 and the VCM 15.

The head 12 is connected to a head amplifier (head IC) 17 mounted on, for example, a flexible printed circuit board (FPC). Read/write signals are transmitted between the head amplifier 17 and the head 12. The head amplifier 17 has a read amplifier for amplifying a read signal read by the head 12. The head amplifier 17 also has a write amplifier for converting to-be-written data (hereinafter referred to as "write data"), supplied from a read/write (R/W) channel (read/write IC) 18, into a write current and outputting it to the head 12.

The R/W channel 18 executes various types of signal processing such as A/D (analog/digital) conversion processing on a read signal, encoding processing on write data, decoding processing on to-be-read data (hereinafter referred to as "read data"), etc. The R/W channel 18 has a pulsing function of pulsing a read signal and outputting it as pulsed read data. The R/W channel 18 also has a function of extracting servo burst data from servo data in accordance with a timing signal (burst timing signal) output from a gate array 19. This burst data is supplied to the CPU 22 and used for track following control executed by the CPU 22.

The gate array 19 has a function of generating various types of timing signals including the burst timing signal, on the basis of a read pulse signal output from the R/W channel 18. The gate array 19 also has a function of extracting a track code contained in servo data. This track code is supplied to the CPU 22 and used for seek control for moving the head 12 to a target track.

An HDC 20 has a hang-up detecting unit 201 related to the present invention, and a task file register block 202. The unit 201 detects a hang-up state, if there is one, of the HDD while a command is executed by the HDD, thereby supplying the CPU 22 with an interrupt signal INT. The task file register block 202 is used to store a task file as information on, for example, the execution of a command supplied from the host system.

The HDC (disk controller) 20 also has an interface control unit 203, a disk control unit 204 and a buffer control unit 205. The interface control unit 203 controls transmission of a command (a write command, a read command, etc.) and data between itself and the host system. The disk control unit 204 controls data transfer between itself and the disk 11. Specifically, the disk control unit 204 controls a disk read operation, in which data required by the host system is read from the disk 11 via the R/W channel 18 and transferred to a buffer RAM (Random Access Memory) 21 via the buffer control unit 205. The disk control unit 204 also controls a disk write operation, in which write date stored in the buffer RAM 21 is fetched via the buffer control unit 205 and written into the disk 11 via the R/W channel 18. The buffer control unit 205 controls access to the buffer RAM 21. The buffer control unit 205 also manages data stored in the buffer RAM 21. This data is stored while commands relating to read/write operations are executed. In other words, this data is write data which is transferred from the host system and is to be written into the disk 11, and read data which is read from the disk 11 and is to be transferred to the host system. The buffer control unit 205 further manages the state of execution of a command relating to a read or write operation, i.e. manages till which sector the read or write operation designated by the command has been executed. Data used for the management is stored in the buffer RAM 21.

The HDC 20 is connected to the buffer RAM 21. The buffer RAM 21 is a buffer memory for temporarily storing the data (write data) which is transferred from the host system and is to be written into the disk 11, and the data (read data) which is read from the disk 11 and is to be transferred to the host system.

The CPU 22 executes the entire control of the HDD in accordance with a control program. Specifically, the CPU 22 executes control for moving the head 12 to a sought target track and settling it in a target range of the track, on the basis of a track code (cylinder number) extracted by the gate array 19 and burst data extracted by the R/W channel 18. The CPU 22 also controls the HDC 20 in accordance with a read/write command from the host system, so as to execute disk control (read/write access control).

Moreover, upon receiving the interrupt signal INT from the hang-up detecting unit 201 of the HDC 20, the CPU 22 recognizes that the HDD has reached a hang-up state, and controls re-execution of a command when necessary. Before re-executing the command, the CPU 22 determines whether or not the re-execution can cause the HDD to be released from the hang-up state.

The CPU 22 is connected to a ROM (Read Only Memory) 23 that pre-stores the control program, and a RAM 24 that provides, for example, a work area for the CPU 22. The ROM 23 and the RAM 24 can be installed in the CPU 22.

A host interface 25 serves as an interface between the HDD and the host system, and is connected to the HDC 20.

FIG. 3 shows the structure of the hang-up detecting unit 201. The unit 201 comprises a hang-up detector 201a and an interrupt generator 201b. The detector 201a detects a hang-up state of the HDD when it occurs as a result of execution of a command by the HDD. The interrupt generator 201b generates the interrupt signal INT to the CPU 22 when the detector 201a has detected the hang-up state.

The detector 201a comprises a time limit register 201c, a timer 201d and a comparator 201e. The register 201c is used to set the upper limit of a period for which the HDD is monitored whether or not it is in a busy state. The value set by the register 201c indicates the upper limit of a period required for the HDD to execute a command. As the time limit set by the register 201c, one of T0 and T1 (T0<T1) is used, depending upon the type of a command executed in the HDD. T1 is used if the command to be executed is a special one that requires a lot of time for its execution. T0 is a time limit as a default value, and is used when the command to be executed is other than a special one, i.e. a usual command. Usual commands can be executed in a shorter time than special commands, and include a read command, a write command, etc. On the other hand, the special commands include, for example, a self-test command for testing the HDD itself.

The timer 201d is used to count a period for which the busy state is monitored from the start of execution of a command supplied from the host system. The comparator 201e compares the value of the timer 201d (counted time) with the set value of the register 201c (time limit). If the value of the timer 201d exceeds the set value (time limit) of the register 201c, i.e. if the time is over, the comparator 201e supplies the interrupt generator 201b with a signal 201f indicating that the HDD is detected to be in the hang-up state.

FIG. 4A illustrates the structure of the task file register block 202. The task file register block 202 comprises a status register 202a, a command register 202b and an address register 202c. The register 202a is used to indicate the state of the HDD. The register 202b is used to store a command that is being executed. The register 202c is used to store address data designated by a command that is being executed, when the command relates to a read/write operation. The address data includes a start address and the number of blocks (sectors).

The status register 202a is, for example, an 8-bit register as shown in FIG. 4B. Bit 7 included in bits 0 to 7 of the register 202a serves as a BSY bit indicating whether or not the HDD is in a busy command processing state. The bit 6 of the register 202a serves as a RDY bit indicating whether or not the HDD is in a ready state. The bit 3 of the register 202a serves as a DREQ bit indicating a state in which the HDD requests data of the host system. There are two types of data request. One is a request to the host system to transfer data from the HDD to the host system. The other is a request to the host system to transfer data from the host system to the HDD.

Referring then to the flowcharts of FIGS. 5 to 8, the operation of this embodiment will be described.

[Operation of the HDD When it is Booted]

When the HDD is booted, the CPU 22 sets the time limit T0 as a default value in the register 201a of the hang-up detecting unit 201 incorporated in the HDC 20.

[Operation of the HDD When Starting the Execution of a Command]

A command supplied from the host system via the host interface 25 is received by the HDC 20. The HDC 20 transfers the received command to the CPU 22. The CPU 22, in turn, sets (turns on) the BSY bit (bit 7) included in the status register 202a of the task file register block 202 in the HDC 20, thereby starting control of the execution of the command. At this time, i.e. at the start of execution of the command, the CPU 22 executes a step S1. Specifically, at the step S1, the CPU 22 determines whether the command to be executed is a usual command for which the time limit T0 as a default value is used as the time limit of monitoring the busy state, or a special command for which the time limit T1 greater than T0 is used.

If the command is a usual command such as a read command or a write command, the CPU 22 determines that the set value of the register 201c of the hang-up detecting unit 201 can be used for monitoring the busy state. This is because the register 201c already has the time limit T0 for usual commands as the set value. The CPU 22 then starts the timer 201d (step S2).

If, on the other hand, the command is a special command such as the self-test command, the CPU 22 changes the value of the register 201c from the limit value T0 for the usual commands to the time limit T1 for the special commands (step S3). In this case, the CPU 22 turns on a change flag (not shown) (step S4). Turn-on of the change flag indicates that the set value of the register 201c is changed to T1, i.e. that the set value is not the default value. Subsequently, the CPU 22 proceeds from the step S4 to the step S2, thereby starting the timer 201d of the unit 201. The timer 201d may be modified such that it automatically starts when the HDC 20 has received a command from the host system, but not under the control of the CPU 22. In this structure, when the command from the host system has been determined to be a special command at the step S1, the CPU 22 changes the set value of the register 201c from T0 to T1, and then the timer 201d is re-started.

The comparator 201e of the unit 201 compares, while the HDD executes a command, the counted time of the timer 201d (i.e. the busy-state monitoring time) with the set value of the register 201c (i.e. time limit). If the value of the timer 201d exceeds the set value of the register 201c, i.e. if the time is over, the comparator 201e outputs a signal 201f indicating logic "1" as a comparison result. The signal 201f as logic "1" indicates a state in which the busy state is not eliminated even after the time limit, i.e. indicates that a hang-up state, in which the execution of a command is not finished even after the time limit, has been detected. The state indicated by the signal 201f of logic "1" is continued while, for example, the value of the timer 201d exceeds the set value of the register 201c.

When the signal 201f output from the comparator 201e has logic "1", the interrupt generator 201b of the hang-up detecting unit 201 generates an interrupt signal INT (for hang-up detection) to the CPU 22. This interrupt signal INT is used to inform the CPU 22 that the hang-up state, in which the execution of a command does not finish even after the time limit, has occurred.

On the other hand, if the execution of the command finishes before the value of the timer 201d exceeds the set value of the register 201c, the interrupt generator 201b does not output the interrupt signal INT. In this case, the BSY bit of the status register 202a is reset (turned off) by the CPU 22.

[Operation of the HDD When the Execution of a Command Finishes]

When the execution of a command finishes, the CPU 22 stops the timer 201d (step S11). After that, the CPU 22 determines whether or not the change flag is in the ON state (step S12). If the change flag is in the ON state, i.e. if the value of the register 201c is changed to T1, the CPU 22 returns the value of the register 201c to the default value T0 (step S13), thereby turning off (resetting) the change flag (step S14). If, on the other hand, the change flag is not in the ON state, i.e. if the value of the register 201c is kept at the default value T0, the CPU 22 finishes the processing.

[Operation of the HDD When an Interrupt Signal is Supplied Thereto for Detecting Hang-up]

An interrupt signal INT generated by the interrupt generator 201b of the hang-up detecting unit 201 is received by the CPU 22. Upon receiving the interrupt signal INT, the CPU 22 executes processing at a step S21. At the step S21, a command, and data indicating hang-up that has occurred during the execution of the command are recorded in the log area 111a included in the system area 111 on the disk 11. As a result, the host system can obtain data indicating the occurrence of hang-up by supplying the HDD with a special command to allow the reading of monitor information stored in the log area 111a, thereby reading the monitor information from the HDD. In this case, measures to avoid hang-up can be adopted by using the obtained information concerning the occurrence of hang-up and used for checking its cause. The log area 111a may be provided in a programmable non-volatile memory other than the disk 11, such as an EEPROM (Electrically Erasable Programmable Read Only Memory).

Thereafter, the CPU 22 checks the type of a command executed when hang-up occurs (step S22). The CPU 22 determines whether or not the command executed when hang-up occurs requires transmission of data between the host system and the HDD (step S23). The command that requires data transmission therebetween is a command relating to a read or write operation.

In the case of a command that does not relate to a read or write operation, i.e. a command that does not require transmission of data between the host system and the HDD, the CPU 22 determines that the cause of the hang-up state exists in the HDD itself. In this case, the CPU 22 determines that the hang-up state may be overcome by re-executing the command, and re-executes the command (step S24).

On the other hand, in the case of a command relating to a read or write operation, i.e. a command that requires data transmission between the HDD and the host system, the CPU 22 determines that the cause of the hang-up state can also exist in the host system. In this case, the CPU 22 determines whether or not it is possible that the hang-up state will be overcome by the re-execution of the command (step S25). At the step S25, the CPU 22 determines whether the cause of the hang-up state exists in the HDD or in the host system. In accordance with the determination result, the CPU 22 determines whether or not it is possible that the hang-up state will be overcome by the re-execution of the command. The step S25 will be described in more detail.

The CPU 22 first determines whether or not the DREQ bit included in the status register 202a of the task file register block 202 is set (ON)(step S31). If the executed command is a command relating to a read operation, such as a read command, the DREQ bit is turned on for a first period. The first period indicates a period for which data read from the disk 11 in units of one sector, i.e. data to be transferred to the host system, is temporarily stored in the buffer RAM 21. If, on the other hand, the executed command is a command relating to a write operation, such as a write command, the DREQ bit is turned on for a second period. The second period indicates a period for which the transfer of write data of the number of blocks (sectors) designated by the write command has not yet been finished, and not-yet-written write data of one sector or more does not exist in the buffer RAM 21.

If the DREQ bit is in the OFF state, the CPU 22 determines that the cause of the hang-up state is in the HDD, and hence it is possible that the hang-up state will be overcome by re-executing the command (step S32). If, on the other hand, the DREQ bit is in the OFF state, the CPU 22 determines whether the executed command relates to a read operation or a write operation (step S33).

If the command relates to a read operation, i.e. if the command requires transmission of data (read data) from the buffer RAM 21 to the host system, the CPU 22 determines whether or not the buffer RAM 21 stores read data (data to be transferred to the host system) of one sector or more (step S34). If the buffer RAM 21 stores read data of one sector or more, i.e. if data of one sector or more, which is to be transferred to the host system, is left in the buffer RAM 21 even when the DREQ bit is in the ON state, the CPU 22 determines that the cause of the hang-up state exists in the host system. In this case, the CPU 22 determines that the hang-up state cannot be overcome even by re-executing the command (step S35). On the other hand, if the buffer RAM 21 does not store read data of one sector or more, the CPU 22 determines that the cause of the hang-up state exists in the HDD. In this case, the CPU 22 determines that it is possible that the hang-up state will be overcome by re-executing the command (step S32).

In the case of a command relating to a write operation, i.e. a command that requires data transmission from the host system to the buffer RAM 21, the CPU 22 determines whether or not the buffer RAM 21 stores write data of one sector or more (step S36). If the buffer RAM 21 does not store write data of one sector or more, i.e. if no new data of one sector or more is transferred to the buffer RAM 21 even when the DREQ bit is in the ON state, the CPU 22 determines that the cause of the hang-up state exists in the host system. In this case, the CPU 22 determines that the hang-up state cannot be overcome even by re-executing the command (step S35). On the other hand, if the buffer RAM 21 stores write data (data to be written into the disk 11) of one sector or more, i.e. if the DREQ bit is in the ON state even when data of one sector or more, which is not yet written in the disk 11, is left in the buffer RAM 21, the CPU 22 determines that the cause of the hang-up state exists in the HDD. In this case, the CPU 22 determines that it is possible that the hang-up state will be overcome by re-executing the command (step S32).

If the CPU 22 determines that re-execution of the command can eliminate the hang-up state, it re-executes the command (step S24). To re-execute the command, the CPU 22 asks the buffer control unit 205 of the HDC 20 about the present state of execution of the command, i.e. as to till which sector processing relating to the read or write operation designated by the command has been executed before the occurrence of the hang-up state. As a result, the CPU 22 can perform re-execution of the command on a sector following the last sector on which the read or write operation has already been performed immediately before the occurrence of the hang-up state.

On the other hand, if the CPU 22 determines that the cause of the hang-up state is in the host system, and hence the hang-up state cannot be overcome even by re-executing the command, the CPU 22 executes processing at a step S26. At the step S26, the RDY bit of the status register 202a incorporated in the task file register block 202 is reset (OFF). At the same time, the BSY bit of the status register 202a is also reset (OFF). This enables the host system to recognize the HDD is in a "Not Ready" state, which means that a command from the host system cannot completely be executed because of, for example, different protocols between the systems. In other words, resetting (turning off) of at least the RDY bit of the status register 202a enables the host system to be informed of the fact that the HDD is in the "Not Ready" state. To realize the above recognition, the host system must read the contents of the status register 202a.

Although, in the above-described embodiment, the time limit is switched between T0 and T1 in accordance with the type of a command, the invention is not limited to this. For example, it may be modified so that commands to be executed by the HDD are classified into three or more groups corresponding to periods required for executing them (standard periods required for their execution), and predetermined time limits are assigned to the respective command groups. In this case, the hang-up state can be detected more accurately by switching the time limits in accordance with a group to which a command belongs.

Further, although in the embodiment, the hang-up detecting unit 201 is always in an operative state, the invention is not limited to this. For example, the hang-up detecting unit 201 may be modified such that its state (operative or inoperative) can be switched by the host system.

Figure 7:
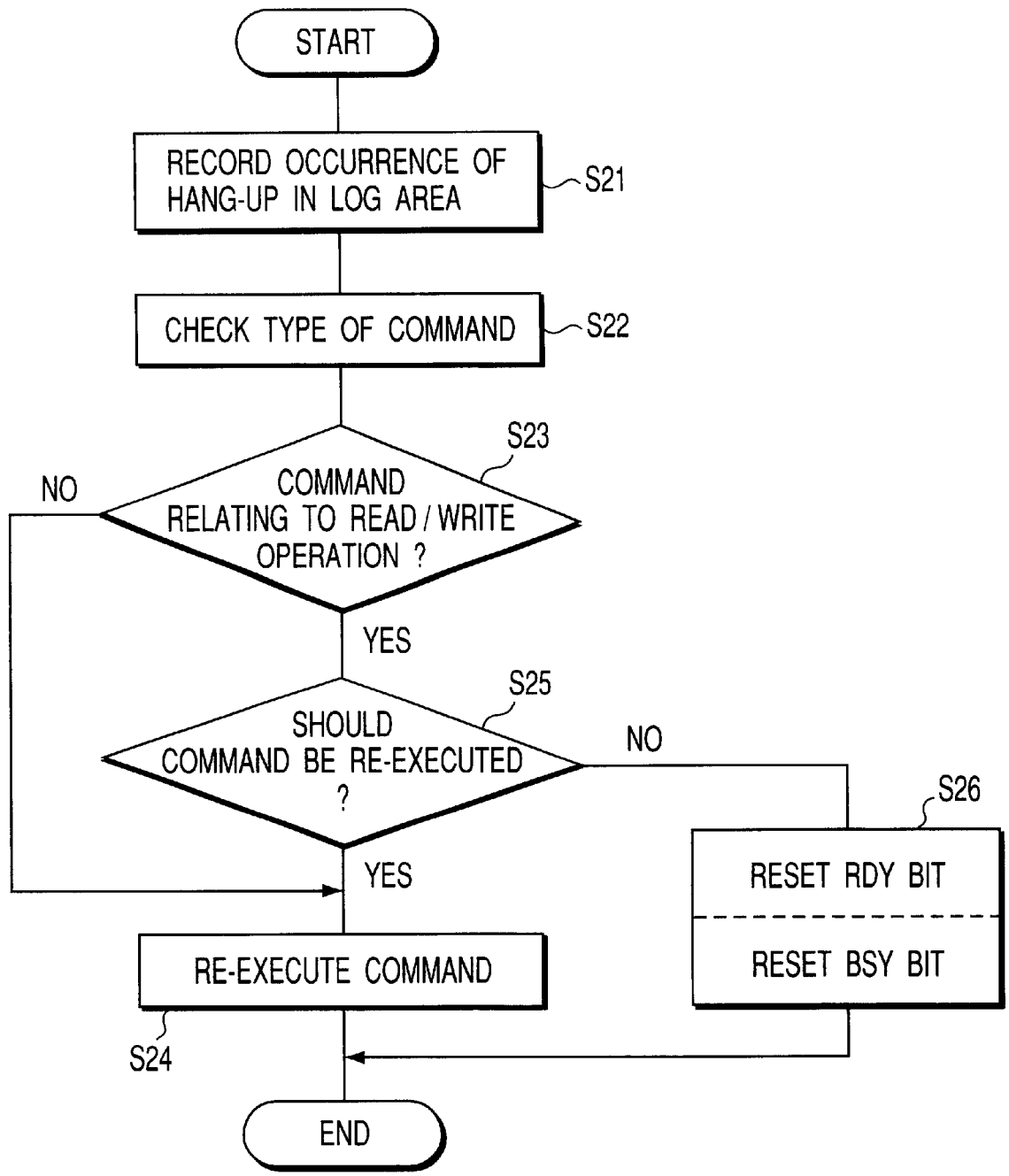
FIG. 7 is a flowchart useful in explaining a procedure of processing executed in the embodiment by a CPU when a hang-up detection interrupt is received.
Figure 8:
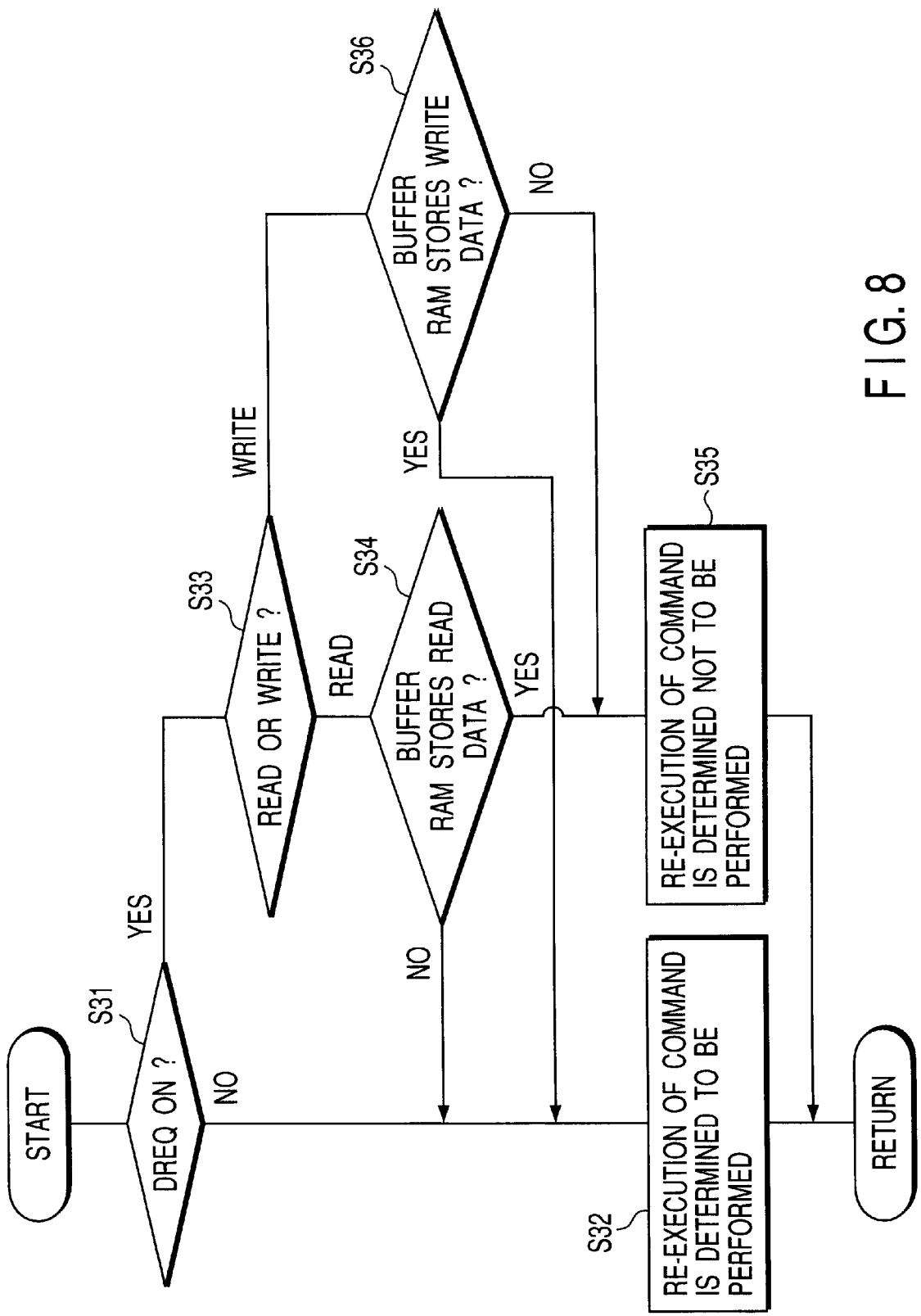
FIG. 8 is a flowchart useful in explaining, in more detail, a procedure of processing executed at a step S25 of FIG. 7.

Moreover, when the CPU 22 has received an interrupt signal INT output from the interrupt generator 201b of the hang-up detecting unit 201, it may be modified to execute, for example, only the processing at the step S21 included in the flowchart of FIG. 7. Alternatively, the CPU 22 may execute only the processing at the step S22 et seq. Furthermore, in the case of a command relating to a read or write operation, the step S25 is skipped over, and the processing at the step S24 or S26 may be executed unconditionally.

In addition, although in the embodiment, the present invention is applied to an HDD (a magnetic disk drive), it is also applicable to a disk storage system other than the HDD, such as a floppy disk drive, a CD-ROM drive, a magneto-optical disk drive, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk controller incorporated in a disk storage system having a CPU which controls execution of a command supplied from a host system, comprising:

a detector which detects a hang-up state of the disk storage system when the hang-up state occurs as a result of execution of a command in the disk storage system, wherein the detector includes a register which sets a value indicating an upper limit of the command execution period, a timer which counts the command execution period, and a comparator which compares a counted value of the timer with the value set by the register, and outputting a signal indicating that the hang-up state has been detected, when the counted value exceeds the value set by the register, wherein the register sets a value corresponding to a type of a command to be executed, the value being included in values prepared for respective types of commands classified into groups based on respective standard periods required for execution of the commands; and an interrupt generator which generates an interrupt signal to the CPU for interrupting a management of the CPU when the detector has detected the hang-up state.

2. A disk storage system comprising:

a disk storage medium which is used to record data;

a CPU which controls execution of a command supplied from a host system; and a disk controller which controls transmission of a command and data between the disk storage system and the host system, the disk controller including a detector which detects a hang-up state of the disk storage system when the hang-up state occurs as a result of execution of a command in the disk storage system, and an interrupt generator which generates an interrupt to the CPU when the detector has detected the hang-up state, and wherein:

the detector includes a register which sets a value indicating an upper limit of the command execution period, a timer which counts the command execution period, and a comparator which compares a counted value of the timer with the value set by the register, and outputting a signal indicating that the hang-up state has been detected, when the counted value exceeds the value set by the register; and the register sets a value corresponding to a type of a command to be executed, the value being included in values prepared for respective types of commands classified into groups based on respective standard periods required for execution of the commands.

3. A disk storage system comprising:

a disk storage medium which is used to record data;

a CPU which controls execution of a command supplied from a host system;

a disk controller which controls transmission of a command and data between the disk storage system and the host system, the disk controller including a detector which detects a hang-up state of the disk storage system when the hang-up state occurs as a result of execution of a command in the disk storage system, and an interrupt generator which generates an interrupt to the CPU when the detector has detected the hang-up state; and further comprising storage means having a log area for recording information that includes data indicating that a hang-up state has occurred, the information recorded in the log area being able to be read when a predetermined command is transmitted from the host system, and wherein the CPU includes recording means for recording, in the log area, the data indicating that a hang-up state has occurred, in accordance with an interrupt generated by the interrupt generator.

4. A disk storage system comprising:

a disk storage medium which is used to record data;

a CPU which controls execution of a command supplied from a host system; and a disk controller which controls transmission of a command and data between the disk storage system and the host system, the disk controller including a detector which detects a hang-up state of the disk storage system when the hang-up state occurs as a result of execution of a command in the disk storage system, an interrupt generator which generates an interrupt to the CPU when the detector has detected the hang-up state, and a status register storing status information including a ready bit that indicates whether or not the disk storage system is in a ready state, and wherein the CPU includes means responsive to an interrupt, generated by the interrupt generator, for invalidating the ready bit of the status register.

5. A disk storage system comprising:

a disk storage medium which is used to record data;

a CPU which controls execution of a command supplied from a host system; and a disk controller which controls transmission of a command and data between the disk storage system and the host system, the disk controller including a detector which detects a hang-up state of the disk storage system when the hang-up state occurs as a result of execution of a command in the disk storage system, an interrupt generator which generates an interrupt to the CPU when the detector has detected the hang-up state, and wherein:

the CPU includes re-execution control means responsive to an interrupt, generated by the interrupt generator, for executing control for re-execution of a command having been executed when the hang-up state occurred, means for determining whether a command executed when an interrupt is generated by the interrupt generator is a first type of command that requires data transmission between the disk storage system and the host system, or a second type of command that does not require the data transmission therebetween, and determination means for determining, when the command is determined to be the first type of command, whether or not a cause of the hang-up state exists in the disk storage system; and the re-execution control means is driven when the determination means has determined that the cause of the hang-up state exists in the disk storage system, if the command is determined to be the first type of command, the re-execution control means being driven unconditionally if the command is determined to be the second type of command.

6. The disk storage system according to claim 5, further comprising a buffer memory which temporarily stores write data transferred from the host system and is to be written into the disk storage medium, and read data read from the disk storage medium and to be transferred to the host system, and wherein the determination means determines that the cause of the hang-up state exists in the disk storage system when the buffer memory does not store data of an amount larger than an amount to be transferred to the host system, or when the buffer memory stores data of an amount larger than an amount to be written into the disk storage medium, if the disk storage system is in a data request state in which data transmission to the host system is requested, the determination means determining unconditionally that the cause of the hang-up state exists in the disk storage system if the disk storage system is not in the data request state.

7. The disk storage system according to claim 6, wherein: the disk controller includes a status register storing status information including a ready bit which indicates that the disk storage system is in a ready state, and a data request bit which indicates that the disk storage system is in the data request state; and the determination means determines, on the basis of the data request bit of the status register, whether the disk storage system is in the data request state.

8. The disk storage system according to claim 7, wherein the CPU includes means for invalidating the ready bit of the status register if the determination means determines that the cause of the hang-up state does not exist in the disk storage system.

9. The disk storage system according to claim 6, wherein: the disk controller includes a buffer control unit which controls access to the buffer memory, and managing an execution state of a command that requires access to the buffer memory; and the re-execution control means asks the buffer control unit as to a present execution state of the command before starting re-execution of the command, and starts the re-execution of the command on a sector of data following a sector of the data on which the command has been executed.

* * * * *